(12) United States Patent
Sekulovski et al.

(10) Patent No.: US 8,004,209 B2
(45) Date of Patent: Aug. 23, 2011

(54) METHOD FOR COLOR TRANSITION FOR GENERAL ILLUMINATION SYSTEM

(75) Inventors: Dragan Sekulovski, Eindhoven (NL); Ramon Antoine Wiro Clout, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 12/443,022

(22) PCT Filed: Oct. 2, 2007

(86) PCT No.: PCT/IB2007/054000
§ 371 (c)(1),
(2), (4) Date: Mar. 26, 2009

(87) PCT Pub. No.: WO2008/041182
PCT Pub. Date: Apr. 10, 2008

(65) Prior Publication Data
US 2010/0026206 A1      Feb. 4, 2010

(30) Foreign Application Priority Data
Oct. 5, 2006   (EP) .................................. 06121822

(51) Int. Cl.
    *H05B 37/02*    (2006.01)
(52) U.S. Cl. .................. 315/291; 315/150; 315/169.3
(58) Field of Classification Search .................. 315/294, 315/291, 169.3, 160, 156, 150, 149, 157, 315/158, 159, 307, 308
See application file for complete search history.

(56) References Cited

U.S. PATENT DOCUMENTS

| 5,650,942 | A | 7/1997 | Granger |
| 6,788,812 | B1 | 9/2004 | Wilkins |
| 7,772,788 | B2 * | 8/2010 | Park et al. .................. 315/291 |
| 2006/0098077 | A1 | 5/2006 | Dowling |
| 2008/0203943 | A1 * | 8/2008 | Baaijens et al. ............. 315/291 |
| 2009/0174332 | A1 * | 7/2009 | Sejkora .................. 315/152 |

FOREIGN PATENT DOCUMENTS

| EP | 0696865 A2 | 2/1996 |
| WO | 2005069638 A1 | 7/2005 |
| WO | 2006003624 A1 | 1/2006 |

* cited by examiner

*Primary Examiner* — David Hung Vu

(57) ABSTRACT

The invention relates to a method of controlling a temporal variation of light emitted by an illumination system. The light emitted by the illumination system varies from light having a start color point (14) to light having a target color point (12). The start and target color point are defined in a first color space (XYZ, $RGB_{vid}$, $RGB_{ill}$), which is perceptually non-uniform. The method according to the invention converts the start and target color point from the first color space to a second color space (Lab, Lch), which is more uniform to the human visual system than the first color space. The method further comprises a step of generating an intermediate color point (34, I1, I2) located on a transition-path (p, p') within the second color space, an intermediate distance (d) between the start color point in the second color space and the intermediate color point in the second color space not being larger than a threshold distance (26). The method further comprises converting the intermediate color point from the second color space back to the first color space, and subsequently altering the light emitted by the illumination system (65) from the start color point to the intermediate color point. The invention further relates to an illumination system and a display device.

19 Claims, 5 Drawing Sheets

METHOD FOR COLOR TRANSITION FOR GENERAL ILLUMINATION SYSTEM

This application is a national stage application under 35 U.S.C. §371 of International Application No. PCT/IB2007/054000 filed on Oct. 2, 2007, which claims priority to European Application No. 06121822.8, filed on Oct. 5, 2006, incorporated herein by reference.

FIELD OF THE INVENTION

The invention relates to a method of controlling a temporal variation of light emitted by an illumination system from light having a start color point to light having a target color point. The invention also relates to an illumination system and a display device.

BACKGROUND OF THE INVENTION

A recent development in display technology is the adding of ambient lighting effects (further also referred to as ambilight effects) using an ambient illumination system to enhance the visual experience, for example, when watching content displayed on the display device, or, for example, for creating a certain atmosphere in an environment. This ambilight effect illuminates the surroundings of the display device, such as a television, with light associated with the content of the image currently displayed on the display device. For example, the ambilight effect is generated using an illumination system, which is part of the display device. The illumination system may illuminate a wall behind the display device with light associated with the content of the image. Alternatively, the display device may be connected to a remotely located illumination system for remotely generating the light associated with the content of the image. When the display device displays a sequence of images, for example, a sequence of video frames being part of video content, the content of the images shown in the sequence generally change over time which results in a need for the light associated with the sequence of images to also change over time.

When watching content displayed on the display device ambilight may, next to an enhancement of the visual experience, also be applied to reduce eyestrain. A variation in color and/or intensity from one image to another in video content may be relatively large. Using the ambilight system to illuminate the surroundings of the display device reduces the perceived large color and/or intensity variation from one image displayed on the display device to another, which reduces eyestrain.

An ambient lighting device is, for example, disclosed in PCT patent application WO 2006/003624A1, in which perceptual rules are applied to extract information from video content to enable an intelligent dominant color selection. The selected dominant color is subsequently used to drive the ambilight system such that the light emitted from the ambient lighting system is associated with the light emitted from the video content. A disadvantage of the known ambilight system is that a variation in the emission of the ambient lighting system from one color point associated with the first image to another color point associated with a second image still results in eyestrain.

SUMMARY OF THE INVENTION

It is an object of the invention to provide a method of controlling a temporal variation of light emitted by the ambilight system for reducing eyestrain.

A first aspect of the invention provides a method of controlling the temporal variation of light as claimed in claim 1. A second aspect of the invention provides an illumination system as claimed in claim 17 and a third aspect of the invention provides a display device as claimed in claim 18. Advantageous embodiments are defined in the dependent claims.

According to the first aspect of the invention the object is achieved with a method of controlling a temporal variation of light emitted by an illumination system from light having a start color point to light having a target color point, the start and target color points comprising start and target color coordinates, respectively, in a first color space being perceptually non-uniform, the method comprising the steps of:

converting the start and target color coordinates to converted start and target color coordinates, respectively, in a second color space which is a color space perceptually more uniform to the human visual system than the first color space, generating an intermediate color point having converted intermediate color coordinates which are located on a transition-path within the second color space from the converted start color coordinates to the converted target color coordinates, an intermediate distance between the converted start color coordinates and the converted intermediate color coordinates not being larger than a threshold distance, converting the converted intermediate color coordinates from the second color space to intermediate color coordinates in the first color space, and altering the light emitted by the illumination system from the start color point to the intermediate color point.

The effect of the features according to the invention is that a temporal variation of the light emitted by the illumination system as perceived by a human is limited to a maximum perceived temporal variation associated with the threshold distance in the second color space. By limiting the perceived temporal variation of the light emitted by the illumination system, also the maximum eyestrain, which may occur due to the temporal variation of the light emitted by the illumination system is limited, thus reducing the eyestrain.

In the method according to the invention the start and target color points are both converted from the first color space which is a perceptually non-uniform color space, to converted start and target color coordinates which are coordinates of the start and target color points in the second color space which is perceptually more uniform to the human visual system than the first color space. A distance within the second color space between two color points results in a specific visual experience of a human which is substantially identical for identical distances between two color points throughout the more uniform color space. Known second color spaces are, for example, CIE Lab and CIE Lch color spaces, which are color spaces which are defined to be substantially statically uniform. The use of the second color space for generating the intermediate color point enables the use of the threshold substantially throughout the second color space to prevent the temporal variation of the light emitted by the illumination system to exceed a maximum perceived light variation. The intermediate color point is chosen such that the intermediate distance between the converted start color coordinates and the converted intermediate color coordinates does not exceed the threshold distance, thus ensuring that the light variation when altering the light emitted by the illumination system from the start color point to the intermediate color point does not exceed the maximum perceived variation defined by the threshold distance. Subsequently, the converted intermediate color coordinates are converted to the first color space.

Conversions from the first color space to the second color space are non-linear color conversions well known to the person skilled in the art. The first color space may be, for example, a device independent color space such as the CIE XYZ-color space, or may be, for example, a device dependent color space, for example, a display dependent color space in which a gamma of the display device is corrected with respect to the device independent color space. Also an illumination system dependent color space may exist, ensuring, for example, that the color displayed by the illumination system corresponds to the requested color point, for example, defined in the device independent color space. The step of converting the start and target color points to the second color space may comprise a conversion from, for example, the display device dependent color space to the second color space via the device independent color space. The intermediate color point may be converted from the second color space, via the device independent color space to the illumination system dependent color space. The conversion from the display device dependent color space to the device independent color space, and the conversion from the device independent color space to the illumination system dependent color space may not be visible as a separate step in the method according to the invention, but may each be incorporated in the conversion from the first color space to the second color space and vice versa.

The transition-path between the converted start color coordinates and the converted target color coordinates may, for example, depend on user preferences, for example, defining that a change from one color point to another color point must always include a predefined color point, for example, white, or, for example, a color point having substantially zero luminance (dark). The possible transition paths are typically limited by the color rendering characteristics of the illumination system and typically must be located within a color gamut of the illumination system. Alternatively, the transition path within the more uniform color space may be a straight line between the converted start color coordinates and the converted target color coordinates.

In an embodiment of the method, the steps of the method are applied successively at successive time instants, wherein for each time instant the intermediate color point of a preceding time instant is used as a start color point. A benefit of this embodiment is that the color of the illumination system, when using the method according to the invention, migrates in color steps between the start color point via intermediate color points to the target color point, wherein each of the color steps is limited to limit the maximum eyestrain perceived by man. A further benefit of this embodiment is that when the target color point is altered in the current time instant, the method will automatically adapt to an intermediate color point which is on a transition-path from the start color point to the new target color point. This enables the method to adapt to changing target color points, which often occur in video sequences.

In an embodiment of the method, the intermediate distance is equal to the threshold distance. A benefit of this embodiment is that the alteration of the light emitted by the illumination system in steps during successive time instants is performed in steps, which are perceived by the human visual system as substantially equal. The alteration of the light in substantially equal steps results in a perceived uniform transition from the start color point to the target color point.

In an embodiment of the method, the threshold distance is less than a visible distance, the visible distance between two color points in the second color space corresponding to a just noticeable alteration of light when the light emitted by the illumination system is altered from a first color point of the two color points to a second color point of the two color points. Because the threshold distance is less than the visible distance, an alteration of the light emitted by the illumination system by a step corresponding to the threshold distance in the second color space is a non-visible step. A benefit of this embodiment is that due to the substantially non-visibility of the individual steps of altering the light emitted by the illumination system from the start color point to the target color point, the transition from the start color point to the transition color point is perceived as a smooth alteration of the light.

In an embodiment of the method, the second color space is a perceptually linearized spatial color space, wherein the visible distance is substantially inversely proportional to a period of time between two successive time instants. A perceptually linearized spatial color space, such as the CIE Lab and CIE Lch color space, are known color spaces in which the linearization process is performed by statically comparing two areas reflecting a color. A just noticeable difference between the colors reflected from each area arranged next to each other defines the metric of the perceptually linearized spatial color space, which is in steps of the just noticeable differences. The inventor has realized that using the known perceptually linearized color space as the second color space according to the invention for successively altering the light emitted by the illumination system, the visible distance is dependent on the period of time between two successive time instants. Because the visible distance is different for different periods of time between the two successive time instants, the time required to obtain, for example, a smooth transition from the start color point to the target color point may differ depending on the period of time. This can be used to optimize a time required to alter the light of the illumination system from the start color point to the target color point, while, for example, remaining a smooth alteration of the light.

In an embodiment of the method, the second color space is a perceptually linearized spatial color space, wherein a shape of a surface in the second color space defining the visible distance from a specific color point is an ellipsoid surrounding the specific color point. In the perceptually linearized spatial color space, a shape of a surface defining the just noticeable difference is a sphere by definition. The inventor has realized that when using the perceptually linearized spatial color space in a dynamic alteration of the light from the start color point to the target color point, the perceptually linearized spatial color space is not uniform. The visible distance being a distance between two color points in the second color space corresponding to a just noticeable dynamic alteration of light when the light emitted by the illumination system is altered from the first of the two color points to the second of the two color points, may be larger in one direction of the perceptually linearized spatial color space compared to another direction of the perceptually linearized spatial color space, resulting in the surface defining the visible distance from a specific color point as being ellipsoid.

In an embodiment of the method, a period of time between two successive time instants is a constant time interval. The constant time interval may, for example, be the frame rate, which is a time interval between two frames in video content.

In an embodiment of the method, the converted start and target color coordinates are constituted by a start and target luminance coordinate, respectively, on a luminance axis, and by start and target chrominance coordinates, respectively, in a chrominance plane, the luminance axis and the chrominance plane together defining the second color space, and wherein the step of generating an intermediate color point having converted intermediate color coordinates comprises generating an intermediate luminance coordinate of the intermediate color point, a luminance distance between the start luminance coordinate and the intermediate luminance coordinate not being larger than a luminance threshold distance, and generating intermediate chrominance coordinates of the intermediate color point, a chrominance distance between the start chrominance coordinates and the intermediate chrominance coordinates not being larger than a chrominance threshold distance. The alteration of the light of the illumination system is actually split into two steps, one alteration along the luminance axis and one alteration in a plane parallel to the chrominance plane. The subsequent luminance threshold distance and the chrominance threshold distance define a cylinder within the second color space. A benefit of this embodiment is that it allows different thresholds to be set for changes in luminance and changes in chrominance.

In an embodiment of the method, the luminance threshold distance is not larger than a visible luminance distance which is the visible distance between two color points arranged on a line parallel to the luminance axis in the second color space, and wherein the chrominance threshold distance is not larger than a visible chrominance distance which is the visible distance between two color points arranged on a plane parallel to the chrominance plane in the second color space. A benefit of this embodiment is that both the alterations along the luminance axis and parallel to the chrominance plane are not visible and thus can be performed sequentially while still the transition from the start color point to the target color point is perceived as being smooth.

In an embodiment of the method, the chrominance threshold distance is larger than the visible luminance distance. The inventors have found that the perceived chrominance threshold distance may be chosen to be larger than the visible luminance distance, while still the perceived variation is below the visible chrominance distance. This enables larger steps of altering the light emitted by the illumination system into steps corresponding to changes in the second color space parallel to the chrominance plane compared to the steps corresponding to changes in the second color space parallel to the luminance axis. This may result in fewer intermediate steps between the start color point and the target color point and typically results in fewer successive time instants to reach the target color point.

In an embodiment of the method, the start and target chrominance coordinates are constituted by a start and target hue coordinate, respectively, on a hue axis, and by a start and target saturation coordinate, respectively, on a saturation axis, the hue axis and the saturation axis together defining the chrominance plane, wherein the step of generating an intermediate color point having converted intermediate color coordinates further comprises generating an intermediate hue coordinate of the intermediate color point, a hue distance between the start hue coordinate and the intermediate hue coordinate not being larger than a hue threshold distance, and generating an intermediate saturation coordinate of the intermediate color point, a saturation distance between the start saturation coordinate and the intermediate saturation coordinate not being larger than a saturation threshold distance. The subsequent luminance threshold distance, hue threshold distance, and saturation threshold distance defining a cuboid within the second color space. A benefit of this embodiment is that it allows different thresholds to be set for changes in hue and changes in saturation.

In an embodiment of the method, the hue threshold distance is not larger than a visible hue distance, which is the visible distance between two color points arranged on a line parallel to the hue axis in the second color space, and wherein the saturation threshold distance is not larger than a visible saturation distance, which is the visible distance between two color points arranged on a line parallel to the saturation axis in the second color space. A benefit of this embodiment is that both the alteration along the hue axis and along the saturation axis are not visible and can thus be performed sequentially while still the transition from the start color point to the target color point is perceived as being smooth.

In an embodiment of the method, the second color space comprises a color gamut of the illumination system, wherein the step of generating the intermediate color point comprises generating the intermediate color point within the color gamut. A benefit of this embodiment is that it ensures that the intermediate color points can actually be generated by the illumination system.

In an embodiment of the method, the method further comprises a step of converting the intermediate color coordinates of the first color space to intermediate illumination coordinates in an illumination device dependent color space, which is a color space corrected with a gamut of the illumination system. In this additional step the intermediate color point is mapped into the color gamut of the illumination system, ensuring that the intermediate color point represents a color, which can be generated by the illumination system.

In an embodiment of the method, the method further comprises a step of applying low-pass filtering to a signal constituted by successive intermediate color points of the successive time instants. The signal may be defined by successive intermediate color points defined in any of the color spaces. A benefit of this embodiment is that the low-pass filtering of the signal reduces low amplitude high frequency noise, which might be visible to man as an unwanted flickering of the light emitted by the illumination system.

In an embodiment of the method, the method further comprises the step of: adapting the threshold distance using a user-specific parameter. A benefit of this embodiment is that the user may adapt the threshold distance and thus may influence the maximum alteration of the light emitted by the illumination system and as such influence the maximum perceived eyestrain.

In an embodiment of the method, the method further comprises the step of: extracting the target color point from a video frame. A benefit of this embodiment is that the method according to the invention can be applied to real-time displayed video content from which the target color point is extracted.

In an embodiment of the method, the method further comprises the step of: extracting the target color point from an ambience signal. The ambience signal comprises information on the ambient lighting, for example, required at a certain part of the video content. This ambience signal may, for example, contain the target color point which must be obtained by the illumination system at a certain time, for example, after 10 frames, enabling the method according to the invention to gradually change the light emitted by the illumination system such that at the certain time the target color point is obtained. Alternatively, the ambience signal may, for example, contain the required target color point of the light which must be emitted by the illumination system at the current frame of the video content, enabling the method according to the invention to smoothly obtain the target color point through intermediate color points, while substantially maintaining the level of eyestrain below a maximum.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF EMBODIMENTS

Figure 1:
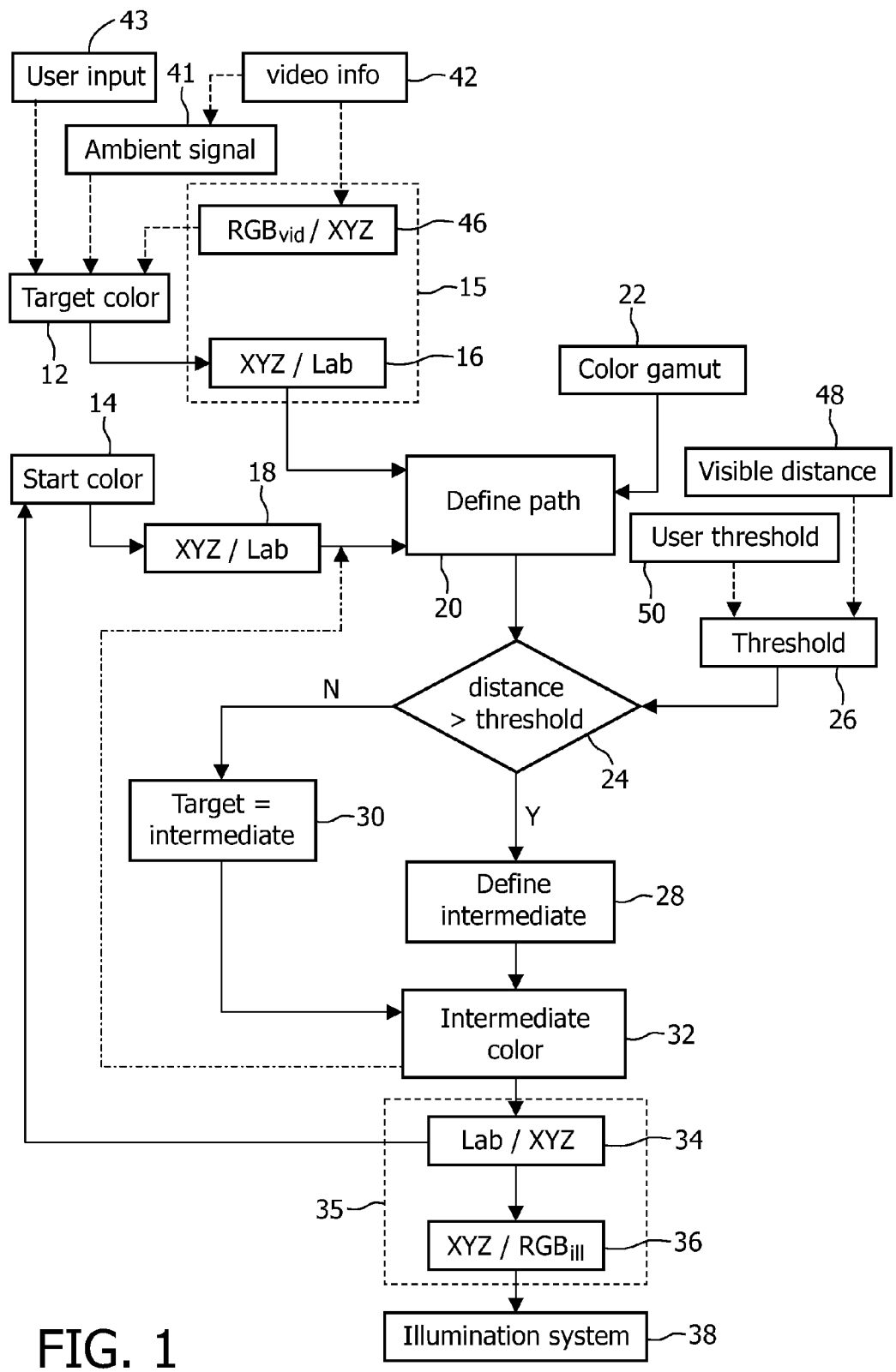
FIG. 1 shows a flow chart of the method according to the invention.

FIG. 1 shows a flow chart of the method of controlling a temporal variation of light emitted by an illumination system 38 according to the invention. In the method according to the invention, the target color point 12 and the start color point 14 each are converted from the first color space XYZ to the second color space Lab, Lch in the conversion steps 16 and 18.

Figure 5A:
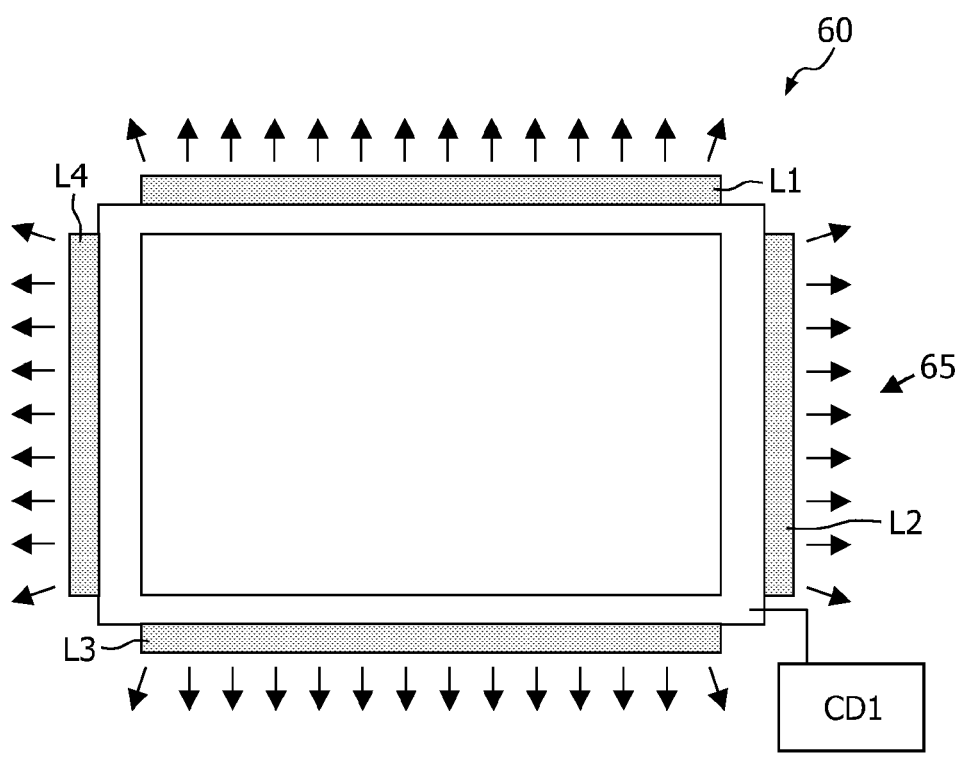
FIGS. 5A and 5B show a display device and an illumination system, respectively.

The target color point 12 may, for example, be extracted from video content 42, which is to be displayed on a display device 60 (see FIG. 5A). Alternatively, the target color point 12 may be defined via a user input 43 requiring a specific color to be displayed by the illumination system 38, or indicating a specific mood to a control device CD1, CD2 (see FIGS. 5A and 5B) in which the control device (CD1, CD2) associates the target color point 12 to the indicated mood. In a further embodiment according to the invention the target color point 12 may be extracted from an ambience signal 41, for example, broadcast parallel to the video content 42, or broadcast as part of the video content 42. The ambience signal 41, for example, indicates the required ambient light associated with the video content 42, and determines, for example, what color must be displayed by the illumination system 38 during which frames of the video content 42.

The start color point 14 is, for example, the current color point of the light emitted by the illumination system 38.

The first color space XYZ is, for example, a CIE (Commission Internationale de l'Eclairage)-defined device independent color space also indicated as CIE XYZ, or in this document also indicated as XYZ. The second color space Lab, Lch is a color space perceptually more uniform to the human visual system than the first color space. The second color space Lab, Lch, is, for example, a perceptually linearized spatial color space, such as the CIE-defined Lab and Lch color space. The perceptually linearized spatial color spaces are known color spaces in which the linearization process is performed by statically comparing two areas reflecting a color. A just noticeable difference between the colors reflected by the two areas arranged next to each other defines the metric of the known perceptually linearized spatial color space, which is in steps of the just noticeable differences between two neighboring color points in the perceptually linearized spatial color space.

After converting the start color point 14 and the target color point 12 to the second color space Lab, Lch, the method according to the invention defines a path p (see FIG. 2B) between the start color point 14 and the target color point 12 in the step "define path" 20.

The path p may, for example, be defined using user preferences (not shown) in which the user defines, for example, that a transition from the start color point 14 to the target color point 12 should always be performed via a predefined color point, for example, white, or, for example, via a color point having substantially zero luminance (dark). Alternatively, the path p may be defined in, for example, the ambience signal 41 (indicated in FIG. 1 as ambient signal), or may be defined by a straight line (not shown) between the start color point 14 and the target color point 12 in the second color space Lab, Lch. The step "define path" 20 may also use a color gamut 22 of the illumination system 38 for defining the path p between the start color point 14 and the target color point 12. The color gamut 22 indicates a range of colors, which can be produced by the illumination system 38. Using the color gamut 22 of the illumination system 38 in determining the path p between the start color point 14 and the target color point 12 ensures that the different colors along the defined path p can actually be produced by the illumination system 38.

The method according to the invention subsequently checks whether a distance between the start color point 14 and the target color point 12, for example, along the path p is larger than a threshold distance 26 in the step "distance>threshold" 24.

The threshold distance 26 may, for example be defined by the user via "user threshold" 50, for example, limiting the perceived temporal variation of the light emitted by the illumination system 38 to a maximum perceived temporal variation associated with the threshold distance 26 in the second color space Lab, Lch. By limiting the perceived temporal variation of the light emitted by the illumination system 38, also the maximum eyestrain, which may occur due to the temporal variation of the light emitted by the illumination system 38, is limited. Alternatively, the threshold distance 26 is, for example, less than a visible distance 48, which corresponds to a just noticeable alteration of light when the light emitted by the illumination system 38 is subsequently altered from a first color point (not shown) to a second color point (not shown). When the threshold distance 26 is less than the visible distance 38, the alteration of light associated with the threshold distance 26 in the second color space Lab, Lch is not visible to man.

The step "distance>threshold" 24 receives the path p and the threshold distance 26 as inputs. If the difference between the start color point 14 and the target color point 12 is not larger than the threshold distance 26 (indicated by the option "N" in the flow chart) the intermediate color point 32 is set to be the target color point 14 in the step "Target=Intermediate" 30. If the difference between the start color point 14 and the target color point 12 is larger than the threshold distance 26 (indicated by the option "Y" in the flow chart) the intermediate color point 32 is defined, for example, along the path p in the step "Define Intermediate" 28.

In the method according to the invention, the step "Define Intermediate" 28 defines the intermediate color point 32, for example, by defining a point on the path p from the start color point 14 to the target color point 12 where an intermediate distance d (see FIG. 2B) is less than the threshold distance 26. The intermediate distance d, for example, is defined along the path p from the start color point 14 to the intermediate color point 32, or, for example, along a straight line between the start color point 14 and the intermediate color point 32. Alternatively, the intermediate distance d between the start color point 14 and the intermediate color point 32 in the second color space may be equal to the threshold distance 26.

Subsequently, the intermediate color point 32 is converted from the second color space Lab, Lch to the first color space XYZ in the conversion step 34, and applied to the illumination system 38. In an embodiment of the method according to the invention, the method further comprises a further conversion step 36 for converting the intermediate color point 32 from the first color space XYZ to an illumination system specific color space $RGB_{ill}$, to ensure that the color of the light emitted by the illumination system 38 corresponds to the intermediate color point 32.

In the embodiment of the method of controlling the temporal variation of light emitted by the illumination system 38, the method comprises separate conversion steps 46, 16 for converting the video information 42 from the video specific color space $RGB_{vid}$ via the first color space XYZ to the second color space Lab, Lch. However, it is immediately clear to the person skilled in the art that the separate conversion steps 46, 16 can be combined to a single conversion step, indicated by a dashed box 15 in FIG. 1, which comprises a conversion from the video specific color space $RGB_{vid}$ to the second color space Lab, Lch. Because both the device dependent color spaces, such as the video specific color space $RGB_{vid}$, and the second color space Lab, Lch are defined with respect to the first color space XYZ, being the device independent color space XYZ, this combined conversion step 15 is always a conversion via the first color space XYZ. Also the separate conversion steps 34 and 36 can similarly be combined to a single conversion step, indicated by a further dashed box 35 in FIG. 1, which comprises a conversion from the second color space Lab, Lch to the illumination system specific color space $RGB_{ill}$. Also this combined conversion step 35 is always a conversion via the first color space XYZ.

Figure 2A:
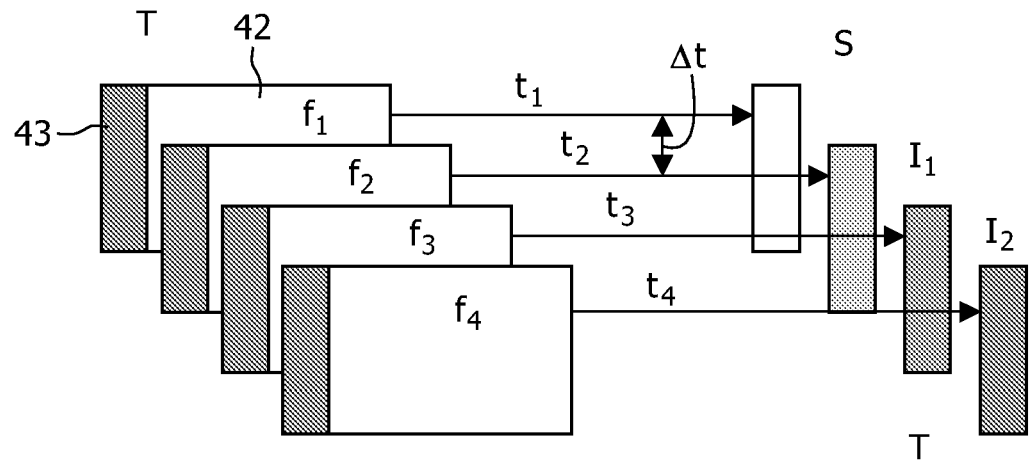
FIG. 2A shows a temporal variation of the light emitted by the illumination system from the start color point via intermediate color points to the target color point.

FIG. 2A shows a temporal variation of the light emitted by the illumination system 38 from the start color point S via intermediate color points I1, I2 to the target color point T. The target color point T is extracted from an area 43 of a video content 42 which is shown in subsequent frames f1, f2, f3, f4. In the example shown in FIG. 2A, the target color point T extracted from the subsequent frames remains the same throughout the subsequent frames f1, f2, f3, f4. Next to the sequence of video frames f1, f2, f3, f4 an associated sequence of color points S, I1, I2, I3 is shown of the light emitted by the illumination system 38. The sequence of color points S, I1, I2, I3 is shown at successive time instants t1, t2, t3, t4, which correspond to the time instants at which the associated video frames f1, f2, f3, f4 are visible on the display device 60 (see FIG. 5A). The first color point S in the sequence of color points S, I1, I2, I3 is the start color point S and is the color of the light currently emitted by the illumination system 38. During the successive time instants t1, t2, t3, t4 the light emitted by the illumination system 38 is altered from the start color point S via the intermediate color points I1, I2 to the target color point T extracted from the area 43 of the video content 42. The intermediate color points I1, I2 are determined using the method according to the invention, which is illustrated in FIG. 2B.

Figure 2B:
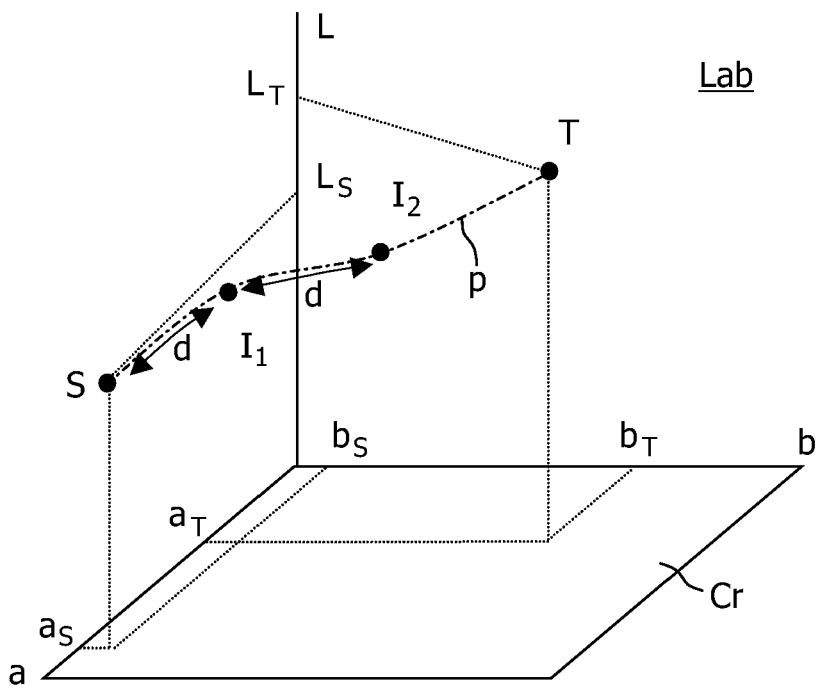
FIG. 2B shows the temporal variation of FIG. 2A in the second color space.

FIG. 2B shows the temporal variation of FIG. 2A in the second color space Lab. The start color point S is converted from the video specific color space $RGB_{vid}$ via the first color space XYZ to the second color space Lab. The position of the start color point S in the second color space is determined by the converted color coordinates $L_S$, $a_S$, $b_S$ along the axis L, a, b defining the second color space Lab. The first intermediate color point I1 is, for example, located on the path p from the start color point S to the target color point T where an intermediate distance d, for example, along the path p from the start color point S to the first intermediate color point I1 is equal to the threshold distance 26. The first intermediate color point I1 is subsequently converted back to the first color space XYZ and the illumination system dependent color space $RGB_{ill}$. The light emitted by the illumination system 38 is altered from light corresponding to the start color point S at a first time instant t1 to light corresponding to the first intermediate color point I1 at a second time instant t2. Subsequently the first intermediate color point I1 is used as a start color point for determining a second intermediate color point I2. The second intermediate color point I2 is, for example, located on the path p from the first intermediate color point I1 to the target color point T, where the intermediate distance d along the path p from the first intermediate color point I1 to the second intermediate color point I2 is equal to the threshold distance 26. The second intermediate color point I2 is subsequently converted back to the first color space XYZ and the illumination system dependent color space $RGB_{ill}$. The light emitted by the illumination system 38 is altered from light corresponding to the first intermediate color point I1 at the second time instant t2 to light corresponding to the second intermediate color point I2 at a third time instant t3. The second intermediate color point I2 is used as a start color point for determining a third intermediate color point I3. In this example, a distance along the path p between the second intermediate color point I2 and the target color point T is less than the threshold distance 26 and thus the third intermediate color point I3 is set to be the target color point T. The light emitted by the illumination system 38 is altered from light corresponding to the second intermediate color point I2 at the third time instant t3 to light corresponding to the target color point T at a fourth time instant t4.

In an embodiment of the method, the successive time instants t1, t2, t3, t4 are substantially constant and correspond to time instants associated with sequential frames f1, f2, f3, f4, which are displayed on the display device 60. If a period of time between two successive time instants is constant and the intermediate distances d are substantially equal to the threshold distance 26, all subsequent changes of the light in individual steps are perceived as substantially equal. This results in a perceived uniform change of the light emitted by the illumination system.

In an embodiment of the method, the threshold distance 26 is less than the visible distance 48 and thus the individual steps when changing the emission of light of the illumination system 38 are substantially not visible, resulting in a smooth transition from the light emitted by the illumination system 38 corresponding to the start color point S to light emitted by the illumination system 38 corresponding to the target color point T.

Figure 3A:
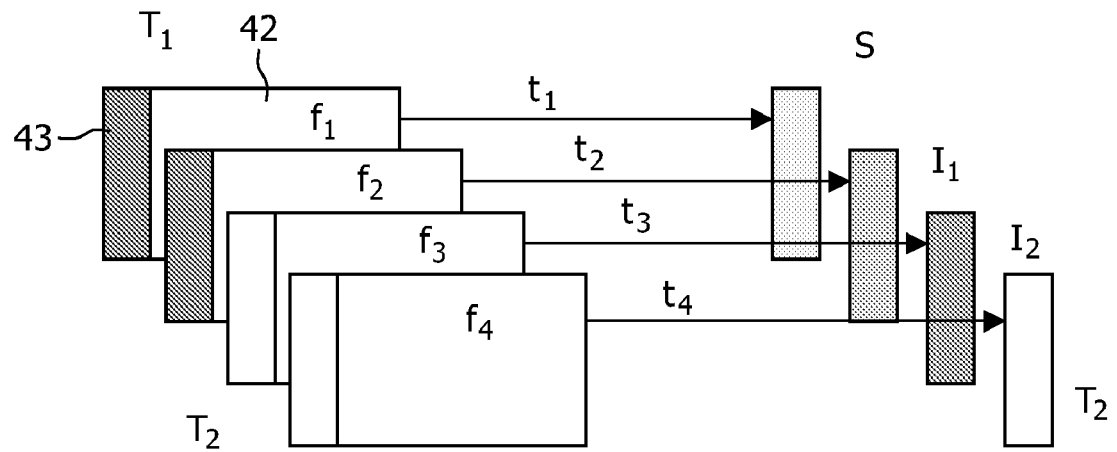
FIG. 3A shows a temporal variation of the light emitted by the illumination system from the start color point via intermediate color points when the target color point is changed.

FIG. 3A shows a temporal variation of the light emitted by the illumination system 38 from the start color point S via intermediate color points I1, I2 to the target color point T1, T2 when the target color point T1, T2 is changed. Analogous to FIG. 2A the target color point T1, T2 is extracted from the area 43 of the video content 42 which is shown in subsequent frames f1, f2, f3, f4. The target color point T1, T2, extracted from the subsequent frames shown in FIG. 3A, changes from a first target color point T1 for the first and the second frames f1, f2 to a second target color point T2 for the third and fourth frames f3, f4. Next to the sequence of video frames f1, f2, f3, f4 is shown an associated sequence of color points S, I1, I2, I3 of the light emitted by the illumination system 38. The sequence of color points S, I1, I2, I3 are shown at successive time instants t1, t2, t3, t4, which correspond to the time instants at which the associated video frames f1, f2, f3, f4 are visible on the display device 60. The first color point S in the sequence of color points S, I1, I2, I3 is the start color point S and is, for example, the color of the light currently emitted by the illumination system 38. During the successive time instants t1, t2 the light emitted by the illumination system 38 is altered from the start color point S via the intermediate color point I1 to the first target color point T1. At the third time instant t3 the first target color point T1 changes to the second target color point T2, for example, due to a change in content of the video frames. The second intermediate color point I2 is located on a further path p' connecting the first intermediate color point I1 with the second target color point T2. During the successive time instants t3, t4 the light emitted by the illumination system 38 is altered from the first intermediate color point I1 via the second intermediate color point I2 to the second target color point T2. The intermediate color points I1, I2 are determined using the method according to the invention, which is illustrated in FIG. 2B.

Figure 3B:
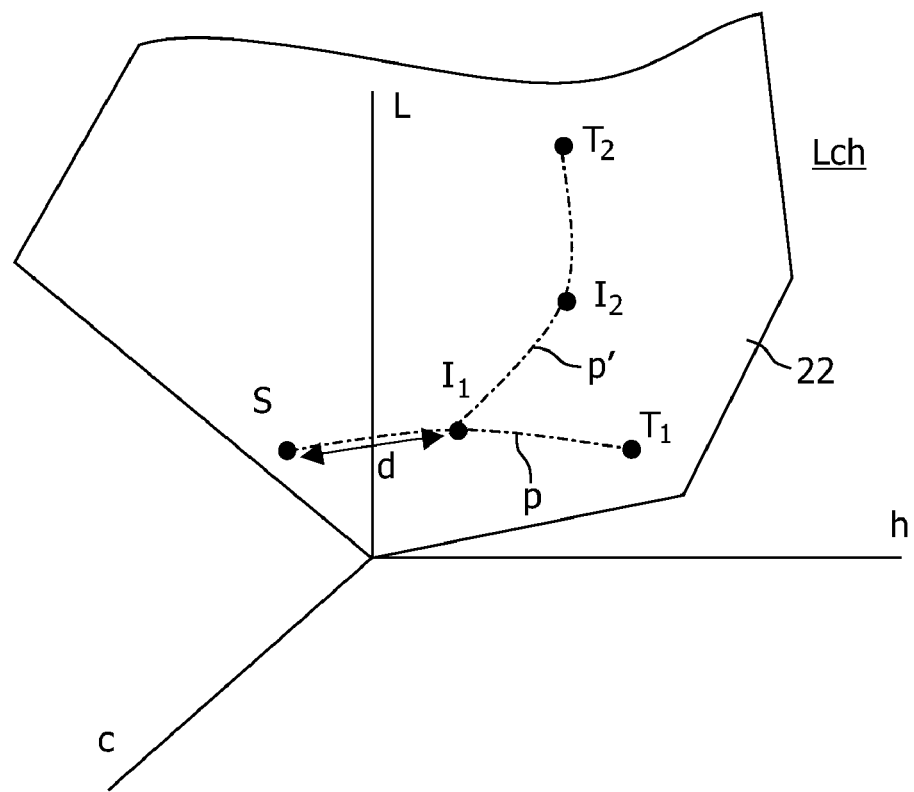
FIG. 3B shows the temporal variation of FIG. 3A in the Lch color space.

FIG. 3B shows the temporal variation of FIG. 3A in the second color space Lch. The start color point S is converted from the video specific color space $RGB_{vid}$ via the first color space XYZ to the second color space Lch. The position of the start color point S is determined by the converted color coordinates $L_S$, $c_S$, $h_S$ along the axis L, c, h defining the second color space Lch (the individual coordinates of the start color point S are omitted for reasons of clarity). The first intermediate color point I1 is located, for example, on the path p from the start color point S to the first target color point T1 where an intermediate distance d along the path p from the start color point S to the intermediate color point I1 is equal to the threshold distance 26. The first intermediate color point I1 is subsequently converted back to the first color space XYZ and the illumination system dependent color space $RGB_{ill}$. The light emitted by the illumination system 38 is altered from light corresponding to the start color point S at a first time instant t1 to light corresponding to the first intermediate color point I1 at a second time instant t2. Subsequently, the first intermediate color point I1 is used as a start color point for determining the second intermediate color point I2. However, the first target color point T1 changes in the third frame f3 to the second target point T2 and thus the second intermediate color point I2 is located on the further path p' between the first intermediate color point I1 and the second target color point T2. The intermediate distance d along the further path p' from the first intermediate color point I1 to the second intermediate color point I2 is equal to the threshold distance 26. The second intermediate color point I2 is subsequently converted back to the first color space XYZ and the illumination system dependent color space $RGB_{ill}$. The light emitted by the illumination system 38 is altered from light corresponding to the first intermediate color point I1 at the second time instant t2 to light corresponding to the second intermediate color point I2 at a third time instant t3. The second intermediate color point I2 is used as a start color point for determining a third intermediate color point I3. Again, in this example, a distance along the further path p' between the second intermediate color point I2 and the second target color point T2 is less than the threshold distance 26 and thus the third intermediate color point I3 is set to be the second target color point T2. The light emitted by the illumination system 38 is altered from light corresponding to the second intermediate color point I2 at the third time instant t3 to light corresponding to the second target color point T2 at a fourth time instant t4.

In an embodiment of the method, the second color space Lch further comprises a color gamut 22, which defines a range of colors, which can be rendered by the illumination system 38. Defining the path p or the further path p' within the color gamut 22 ensures that the intermediate color points I1, I2 can actually be generated by the illumination system 38.

Figure 4A:
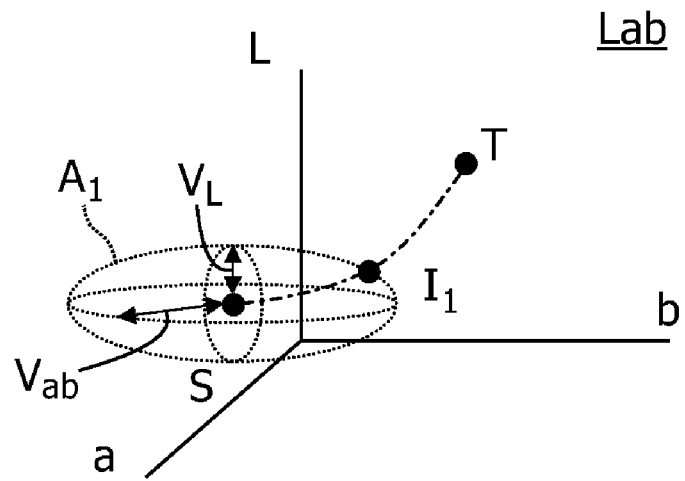
FIGS. 4A and 4B show a surface located in the second color space defining the visible distance from a specific color point.
Figure 4B:
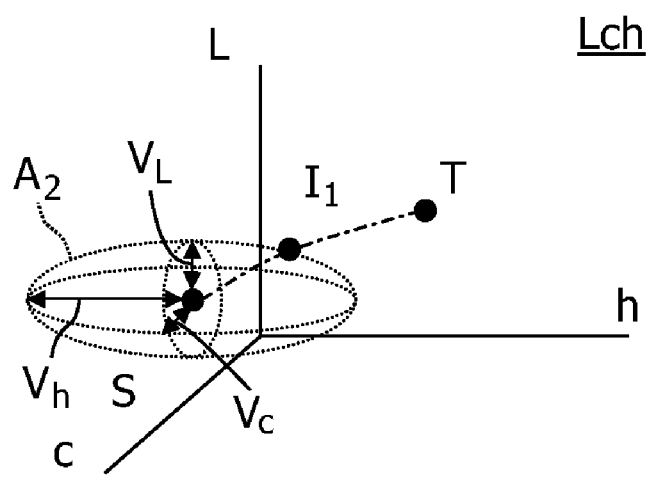

FIGS. 4A and 4B shows a surface A1, A2 located in the second color space Lab, Lch defining the visible distance $V_L$, $V_{ab}$, $V_h$, $V_c$ from a specific color point (being the start color point S in FIGS. 4A and 4B). When using the second color space Lab, Lch being the perceptually linearized spatial color space Lab, Lch in a dynamic alteration of the light according to the invention from the start color point S to the target color point T, then the perceptually linearized spatial color space Lab, Lch is not uniform. The surface A1, A2 defining the visible distance $V_L$, $V_{ab}$, $V_h$, $V_c$ is an ellipsoid A1, A2. The visible distance $V_L$, $V_{ab}$, $V_h$, $V_c$, may be larger in one direction of the perceptually linearized spatial color space Lab, Lch compared to another direction of the perceptually linearized spatial color space Lab, Lch (the visible distance $V_L$, $V_{ab}$, $V_h$, $V_c$ being a distance between two color points in the second color space Lab, Lch corresponding to a just noticeable dynamic alteration of light when the light emitted by the illumination system 38 alters from the first of the two color points to the second of the two color points).

In FIG. 4A the surface A1 is defined by a visible luminance distance $V_L$ parallel to the luminance axis L and a visible chrominance distance $V_{ab}$ parallel to the chrominance plane ab, the second color space Lab being defined by the luminance axis L arranged perpendicular to the chrominance plane ab. The inventor has found that the visible chrominance distance $V_{ab}$ is larger than the visible luminance distance $V_L$. Due to this difference, an intermediate distance $d_{ab}$ (not shown) arranged parallel to the chrominance plane ab may be chosen to be larger than an intermediate distance $d_L$ (not shown) arranged parallel to the luminance axis L while still the alteration of the light associated with the each of the intermediate distances $d_{ab}$, $d_L$ remains not visible to man.

In FIG. 4B the surface A2 is defined by a visible luminance distance $V_L$ parallel to the luminance axis L, a visible hue distance $V_h$ parallel to the hue axis h and a visible saturation distance $V_c$ parallel to the saturation axis c, the second color space Lch being defined by the luminance axis L, the hue axis h and the saturation axis c. Because the visible distances parallel to the axis of the second color space Lch are different, different alteration of the light associated with intermediate distances parallel to the axes can be chosen while each of the alterations of light individually remains substantially not visible to man.

Figure 5B:
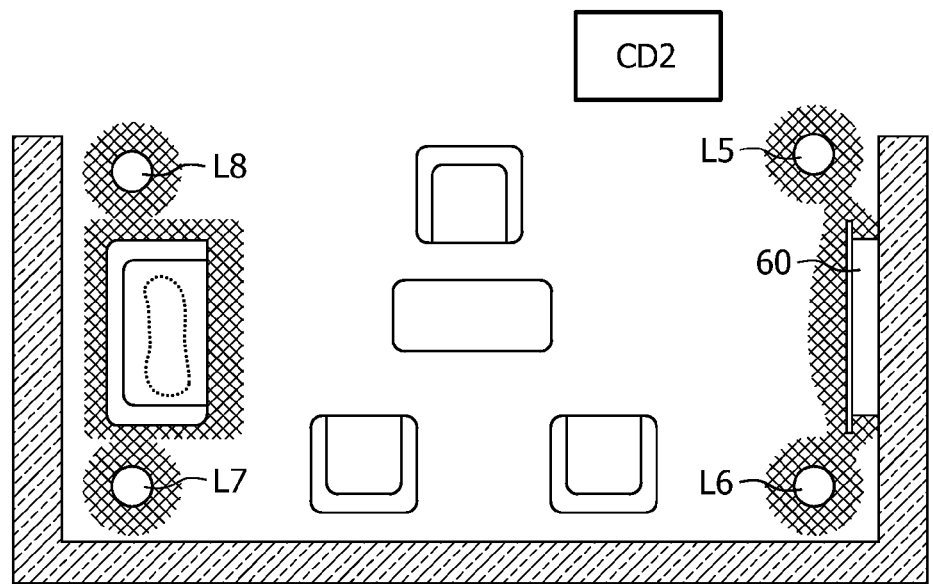

FIGS. 5A and 5B show a display device 60 and an illumination system 65, respectively. The display device 60 of FIG. 5A comprises a plurality of light sources L1, L2, L3, L4 connected to a control device CD1. Alternatively, the light sources L1, L2, L3, L4 for illuminating the surroundings may be located at a distance from the display device 60. The control device CD1 is arranged for applying the method according to the invention for altering the light emitted by the light sources L1, L2, L3, L4. Generally the light sources L1, L2, L3, L4 illuminate the surroundings of the display device 60. The display device 60 may, for example be a television screen, a projection television, a beamer or a computer monitor. The control device CD1 may receive the target color point I2, T, T1, T2 from the display device 60, for example, by extracting the information from (part of) the video frame currently on display on the display device 60. Alternatively, the control device CD1 may receive the target color point from an ambience signal 41 (see FIG. 1) which is broadcast in parallel with the video frames or, for example, broadcast as part of the video frames. The target color point 12, T, T1, T2 may also be applied to the control device CD1 via a user input device (not shown).

The illumination system of FIG. 5B is arranged in a room, and also comprises a plurality of light source L5, L6, L7, L8 connected to a control device CD2. Again, the control device CD2 is arranged for applying the method according to the invention for altering the light emitted by the light sources L1, L2, L3, L4. The control device CD2 may receive the target color point 12, T, T1, T2 from the display device 60 as shown in FIG. 5A, for example, by extracting the information from (part of) the video frame currently on display on the display device. Alternatively, the control device CD2 may receive the target color point from an ambience signal 41 (see FIG. 1) which is broadcast in parallel with the video frames or, for example, broadcast as part of the video frames. The control device CD2 may further define the target color point 12, T, T1, T2 from, for example, audio content, time of day, outside illumination, or from a user input via the user input device (not shown), for example indicating a current mood of the user.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of controlling a temporal variation of light emitted by an illumination system (65) from light having a start color point (14, S) to light having a target color point (12, T, T1, T2), the start color point (14, S) and target color point (12, T, T1, T2) comprising start and target color coordinates, respectively, in a first color space (XYZ, $RGB_{vid}$, $RGB_{ill}$) which is perceptually non-uniform, the method comprising the steps of:
converting the start and target color coordinates to converted start and target color coordinates, respectively, in a second color space (Lab, Lch) which is a color space perceptually more uniform to the human visual system than the first color space (XYZ, $RGB_{vid}$),
generating an intermediate color point (34, I1, I2) having converted intermediate color coordinates which are located on a transition-path (p, p') within the second color space (Lab, Lcd) from the converted start color coordinates to the converted target color coordinates, an intermediate distance (d) between the converted start color coordinates and the converted intermediate color coordinates not being larger than a threshold distance (26),
converting the converted intermediate color coordinates from the second color space (Lab, Lch) to intermediate color coordinates in the first color space (XYZ, $RGB_{vid}$, $RGB_{ill}$), and altering the light emitted by the illumination system (65, 70) from the start color point (14, S) to the intermediate color point (34, I1, I2).

2. Method as claimed in claim 1, wherein the steps of the method are applied successively at successive time instants (t1, t2, t3, t4), wherein for each time instant (t1; t2; t3; t4) the intermediate color point (34, I1, I2) of a preceding time instant is used as a start color point (S).

3. Method as claimed in claim 2, wherein the intermediate distance (d) is equal to the threshold distance (26).

4. Method as claimed in claim 2, wherein the threshold distance (26) is less than a visible distance (48, $V_L$, $V_{ab}$, $V_h$, $V_c$), the visible distance (48, V, $V_L$, $V_{ab}$, $V_h$, $V_c$) between two color points in the second color space (Lab, Lch) corresponding to a just noticeable alteration of light when the light emitted by the illumination system (65) is altered from a first color point of the two color points to a second color point of the two color points.

5. Method as claimed in claim 4, the second color space (Lab, Lch) being a perceptually linearized spatial color space (Lab, Lch), wherein the visible distance (48, V, $V_L$, $V_{ab}$, $V_h$, $V_c$) is substantially inversely-proportional to a period of time ($\Delta t$) between two successive time instants (t1, t2, t3, t4).

6. Method as claimed in claim 4, the second color space (Lab, Lch) being a perceptually linearized spatial color space (Lab, Lch), wherein a shape of a surface (A1, A2) in the second color space (Lab, Lch) defining the visible distance (48, V, $V_L$, $V_{ab}$, $V_h$, $V_c$) from a specific color point is an ellipsoid (A1, A2) surrounding the specific color point.

7. Method as claimed in claim 2, wherein a period of time ($\Delta t$) between two successive time instants (t1, t2, t3, t4) is a constant time interval.

8. Method as claimed in claim 1, wherein the converted start and target color coordinates are constituted by a start and target luminance coordinate, respectively, on a luminance axis (L), and by start and target chrominance coordinates, respectively, in a chrominance plane (ab), the luminance axis (L) and the chrominance plane (ab) together defining the second color space (Lab), and
wherein the step of generating an intermediate color point (34, I1, I2) having converted intermediate color coordinates comprises generating an intermediate luminance coordinate of the intermediate color point (34, I1, I2), a luminance distance ($d_L$) between the start luminance coordinate and the intermediate luminance coordinate not being larger than a luminance threshold distance ($\Delta_L$), and generating intermediate chrominance coordinates of the intermediate color point (34, I1, I2), a chrominance distance ($d_{ab}$) between the start chrominance coordinates and the intermediate chrominance coordinates not being larger than a chrominance threshold distance ($\Delta_{Cr}$).

9. Method as claimed in claim 8, wherein the luminance threshold distance ($\Delta_L$) is not larger than a visible luminance distance ($V_L$) which is the visible distance (48, V, $V_L$, $V_{ab}$, $V_h$, $V_c$) between two color points arranged on a line parallel to the luminance axis (L) in the second color space (Lab, Lch), and
wherein the chrominance threshold distance ($\Delta_{Cr}$) is not larger than a visible chrominance distance ($V_{ab}$) which is the visible distance (48, V, $V_L$, $V_{ab}$, $V_h$, $V_c$) between two color points arranged on a plane parallel to the chrominance plane (Cr) in the second color space (Lab, Lch).

10. Method as claimed in claim 8, wherein the chrominance threshold distance ($\Delta_{ab}$) is larger than the visible luminance distance ($V_L$).

11. Method as claimed in claim 8, wherein the start and target chrominance coordinates are constituted by a start and target hue coordinate, respectively, on a hue axis (h), and by a start and target saturation coordinate, respectively, on a saturation axis (s), the hue axis (h) and the saturation axis (s) together defining the chrominance plane (ab), wherein the step of generating an intermediate color point (34, I1, I2) having converted intermediate color coordinates further comprises generating an intermediate hue coordinate of the intermediate color point (34, I1, I2), a hue distance ($d_h$) between the start hue coordinate and the intermediate hue coordinate not being larger than a hue threshold distance ($\Delta_h$), and generating an intermediate saturation coordinate of the intermediate color point (34, I1, I2), a saturation distance ($d_r$) between the start saturation coordinate and the intermediate saturation coordinate not being larger than a saturation threshold distance ($\Delta_c$).

12. Method as claimed in claim 11, wherein the hue threshold distance ($\Delta_h$) is not larger than a visible hue distance ($V_h$) which is the visible distance (48, V, $V_L$, $V_{ab}$, $V_h$, $V_c$) between two color points arranged on a line parallel to the hue axis (h) in the second color space (Lch), and wherein the saturation threshold distance ($\Delta_s$) is not larger than a visible saturation distance ($V_c$) which is the visible distance (48, V, $V_L$, $V_{ab}$, $V_h$, $V_c$) between two color points arranged on a line parallel to the saturation axis (c) in the second color space (Lch).

13. Method as claimed in claim 1, the second color space comprising a color gamut (22) of the illumination system (65), wherein the step of generating the intermediate color point (34, I1, I2) comprises generating the intermediate color point (I1, I2) within the color gamut (22).

14. Method as claimed in claim 1, wherein the method further comprises a step of converting the intermediate color coordinates of the first color space (XYZ, $RGB_{vid}$, $RGB_{ill}$) to intermediate illumination coordinates in an illumination device dependent color space ($RGB_{ill}$) which is a color space corrected with a gamut (22) of the illumination system.

15. Method as claimed in claim 2, wherein the method further comprises a step of applying low-pass filtering to a signal constituted by successive intermediate color points (34, I1, I2) of the successive time instants (t1, t2, t3, t4).

16. Method as claimed in claim 1, wherein the method further comprises the step of:

adapting the threshold distance (26) using a user-specific parameter (50).

17. Method as claimed in claim 1, wherein the method further comprises the step of:

extracting the target color point (12, T, T1, T2) from a video frame (42).

18. Method as claimed in claim 1, wherein the method further comprises the step of:

extracting the target color point (12, T, T1, T2) from an ambience signal.

19. Illumination system (65) having a plurality of light sources (L1, L2, L3, L4; L5, L6, L7, L8) for emitting light from the illumination system (65, 70), and a control device (CD1, CD2) for controlling the illumination system (65), the control device (CD1, CD2) being arranged for applying the method as claimed in claim 1.

\* \* \* \* \*